(12) United States Patent
Takai et al.

(10) Patent No.: US 9,776,873 B2
(45) Date of Patent: Oct. 3, 2017

(54) CARBON NANOTUBES

(71) Applicant: ZEON CORPORATION, Chiyoda-ku, Tokyo (JP)

(72) Inventors: Hirokazu Takai, Tokyo (JP); Mitsugu Uejima, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/030,975

(22) PCT Filed: Oct. 31, 2014

(86) PCT No.: PCT/JP2014/079655
§ 371 (c)(1),
(2) Date: Apr. 21, 2016

(87) PCT Pub. No.: WO2015/064772
PCT Pub. Date: May 7, 2015

(65) Prior Publication Data
US 2016/0251225 A1  Sep. 1, 2016

(30) Foreign Application Priority Data

Oct. 31, 2013  (JP) ................................. 2013-227439

(51) Int. Cl.
*C01B 31/02* (2006.01)
*B82Y 30/00* (2011.01)

(52) U.S. Cl.
CPC ...... *C01B 31/0286* (2013.01); *C01B 31/0226* (2013.01); *B82Y 30/00* (2013.01); *C01B 2202/36* (2013.01); *Y10S 977/742* (2013.01); *Y10S 977/842* (2013.01)

(58) Field of Classification Search
USPC ........................................................ 977/743
See application file for complete search history.

(56) References Cited

U.S. PATENT DOCUMENTS

| | | | |
|---|---|---|---|
| 2008/0020248 A1* | 1/2008 | Sridhar | H01M 8/04201 429/434 |
| 2009/0272490 A1 | 11/2009 | Liu et al. | |
| 2012/0321544 A1 | 12/2012 | Takai et al. | |

FOREIGN PATENT DOCUMENTS

| | | |
|---|---|---|
| CN | 102781828 A | 11/2012 |
| EP | 2383225 A1 | 11/2011 |
| JP | 2007-084431 A | 4/2007 |
| JP | 2011-207758 A | 10/2011 |
| JP | 2012-126599 A | 7/2012 |
| JP | 2012-213716 A | 11/2012 |
| JP | 2012-250862 A | 12/2012 |

(Continued)

OTHER PUBLICATIONS

Hu et al. (Pore Size Distributions of Single-Walled Carbon Nanotubes, Ind. Eng. Chem. Res. 2004, 43, 708-711).*

(Continued)

*Primary Examiner* — Alexandre Ferre
(74) *Attorney, Agent, or Firm* — Kenja IP Law PC (57) ABSTRACT

Provided are carbon nanotubes that allow effective utilization of the insides thereof as-synthesized, without undergoing opening formation treatment. The provided carbon nanotubes have not undergone opening formation treatment and exhibit a convex upward shape in a t-plot obtained from an adsorption isotherm.

8 Claims, 7 Drawing Sheets

(56) References Cited

FOREIGN PATENT DOCUMENTS

JP          2013-173639 A    9/2013
JP          2013-193916 A    9/2013

OTHER PUBLICATIONS

Machine translation JP 2011207758 A (2011).*
Dec. 9, 2014, Written Opinion of the International Searching Authority issued in the International Patent Application No. PCT/JP2014/079655.
T.S. Miller et al., "Electrochemistry at carbon nanotube forests: sidewalls and closed ends allow fast electron transfer", Chem. Commun., 2012, vol. 48, pp. 7435-7437, May 14, 2012.
Nov. 28, 2016, the Extended European Search Report issued by the European Patent Office in the corresponding European Patent Application No. 14858707.4.

* cited by examiner

CARBON NANOTUBES

TECHNICAL FIELD

The present disclosure relates to carbon nanotubes.

BACKGROUND

Carbon nanotubes (hereinafter also referred to as "CNTs") are one-dimensional nanomaterials composed only of carbon atoms and having a diameter of from 0.4 nm to 50 nm and a length of roughly from 1 μm to hundreds of micrometers. The chemical structure of a carbon nanotube is represented by rolling up and joining a graphite layer. In the case of a carbon nanotube having just one of these layers, the carbon nanotube is referred to as a single-walled carbon nanotube.

Single-walled CNTs are expected to have a wide range of applications as substance and energy stores, separation membranes, electrode materials, and so forth due to their relatively large specific surface area. PTL 1 describes CNTs that have open ends. Open-ended CNTs such as described in PTL 1 have a large specific surface area compared to CNTs that have closed ends.

PTL 2 describes a technique for increasing the specific surface area of single-walled CNTs by carrying out opening formation treatment in which holes are opened at the ends or in the side walls of the single-walled CNTs by oxidation.

CITATION LIST

Patent Literature

PTL 1: JP2007-84431 A
PTL 2: JP2011-207758 A

SUMMARY

Technical Problem

CNTs have internal spaces that are restricted on the atomic/molecular level and that can be used, for example, to store a substance. It is important for CNTs to have a large specific surface area in order to demonstrate various properties such as substance and energy retention, energy transmission, and energy dispersion. Moreover, in addition to a large specific surface area, it is preferable that the insides of the CNTs can be effectively utilized from a viewpoint of sufficiently realizing latent properties of the CNTs.

Methods that can be used to enable effective utilization of the insides of CNTs include a method in which openings are formed at the ends of the CNTs and a method in which openings are formed in the side walls of the CNTs. However, simply forming openings at the ends of the CNTs as in PTL 1 is not sufficient for enabling effective utilization of the insides of the CNTs. On the other hand, the technique in PTL 2 improves properties such as substance and energy retention by forming pores in the side walls. Openings in the side walls differ from openings at the ends in terms that a large number of such openings can be provided randomly in the CNTs. Therefore, openings in the side walls are preferable for enabling effective utilization of the insides of the CNTs because such openings increase accessibility of the insides of the CNTs to substances and so forth. However, in the case of the technique in PTL 2, it is necessary to subject a synthesized aligned CNT aggregate to opening formation treatment, such as oxidation treatment, which is burdensome to carry out. Consequently, there is demand for CNTs that allow effective utilization of the insides thereof in an as-synthesized state, without needing to undergo opening formation treatment, such as oxidation treatment.

In light of the problem described above, the present disclosure aims to provide carbon nanotubes that allow effective utilization of the insides thereof as-synthesized, without undergoing opening formation treatment.

Solution to Problem

An increase in openings in CNTs can be determined through an increase in internal specific surface area. As a result of diligent investigation conducted in order to achieve the above aim, the present inventors discovered that by adopting prescribed conditions in a method in which a feedstock gas is supplied to a catalyst in order to grow CNTs by chemical vapor deposition (hereinafter, referred to as a "CVD"), CNTs can be obtained that, without undergoing opening formation treatment after growth, have a large internal specific surface as a proportion of total specific surface area, remain closed at the ends, and have a large number of openings in the side walls. Specifically, the inventors discovered that it is important to grow CNTs on a catalyst substrate prepared by forming a catalyst through a wet process on a substrate having an area of at least 400 cm² and to grow the CNTs using a continuous CNT production apparatus in which units respectively performing a formation step, a growth step, and a cooling step are connected.

These findings lead to the present disclosure, the main features of which are as follows.

One main feature of presently disclosed carbon nanotubes is that the carbon nanotubes have not undergone opening formation treatment and exhibit a convex upward shape in a t-plot obtained from an adsorption isotherm.

The t-plot preferably has a bending point in a range of $0.2 \leq t \text{ (nm)} \leq 1.5$.

A total specific surface area S1 and an internal specific surface area S2 of the carbon nanotubes obtained from the t-plot preferably satisfy $0.05 \leq S2/S1 \leq 0.30$.

An average external diameter of the carbon nanotubes is preferably from 2 nm to 5 nm.

Advantageous Effect

The presently disclosed carbon nanotubes allow effective utilization of the insides thereof as-synthesized, without undergoing opening formation treatment.

DETAILED DESCRIPTION

The following refers to the drawings to describe embodiments of the presently disclosed CNTs. The presently disclosed CNTs can be produced through a method in which a feedstock gas is supplied to a substrate having a catalyst layer on the surface thereof (hereinafter referred to as a "catalyst substrate") and the CNTs are grown on the catalyst layer by CVD. This method forms an aggregate on the catalyst layer of a large number of CNTs that are aligned in a direction roughly perpendicular to the catalyst substrate. The present description refers to this aggregate as an "aligned CNT aggregate." Furthermore, the present description uses the term "CNTs" to refer to a product that is obtained by collectively peeling the aligned CNT aggregate from the catalyst substrate.

One main feature of the presently disclosed carbon nanotubes is that the carbon nanotubes have not undergone opening formation treatment and exhibit a convex upward shape in t-plot obtained from an adsorption isotherm. The t-plot is obtained based on data measured by a nitrogen gas adsorption method.

Adsorption is a phenomenon in which gas molecules are taken onto a solid surface from the gas phase and is categorized as physical adsorption or chemical adsorption depending on the main cause of adsorption. The nitrogen gas adsorption method utilizes physical adsorption. When the adsorption temperature is kept constant, the number of nitrogen gas molecules that are adsorbed by CNTs increases with increasing pressure. A plot of the relative pressure (ratio of pressure at adsorption equilibrium P and saturated vapor pressure P0) on a horizontal axis and the amount of adsorbed nitrogen gas on a vertical axis is referred to as an "isotherm." The isotherm is referred to as an "adsorption isotherm" in a situation in which the amount of adsorbed nitrogen gas is measured while increasing the pressure and is referred to as a "desorption isotherm" in a situation in which the amount of adsorbed nitrogen gas is measured while decreasing the pressure.

The t-plot is obtained from the adsorption isotherm measured by the nitrogen gas adsorption method by converting the relative pressure to an average thickness t (nm) of an adsorbed layer of nitrogen gas. Specifically, an average adsorbed nitrogen gas layer thickness t corresponding to a given relative pressure is calculated from a known standard isotherm of average adsorbed nitrogen gas layer thickness t plotted against relative pressure P/P and the relative pressure is converted to the corresponding average adsorbed nitrogen gas layer thickness t to obtain a t-plot for the CNTs (t-plot method of de Boer et al.).

Figure 1:
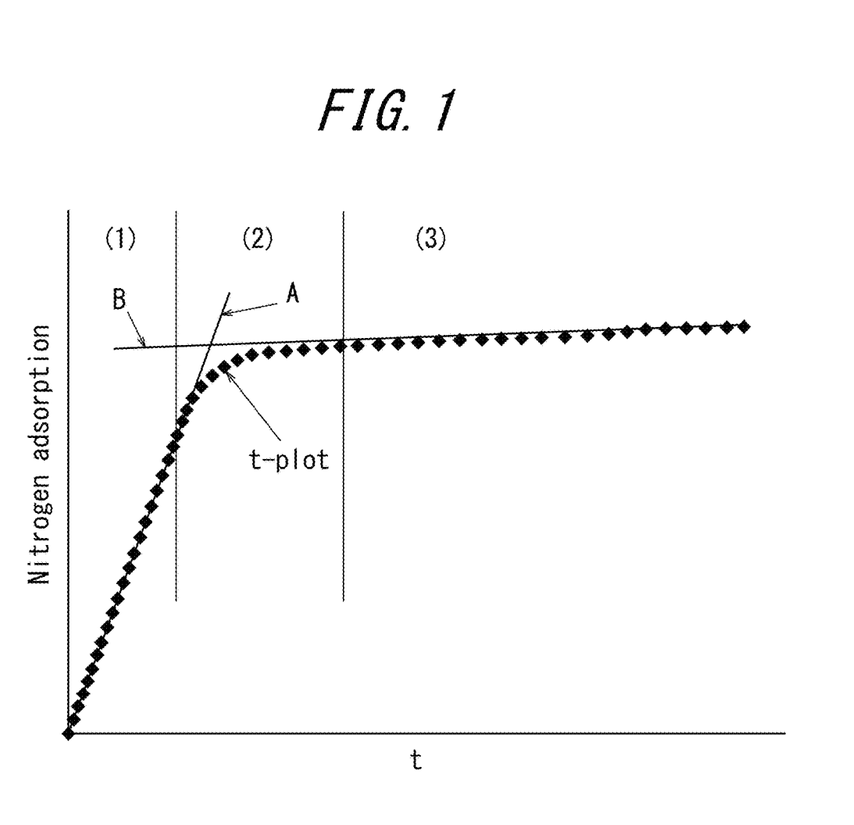
FIG. 1 is a graph illustrating an example of a t-plot for a sample having pores on the surface thereof.

FIG. 1 illustrates a typical t-plot of a sample (not limited to CNTs) having pores at the surface thereof. In such a situation, growth of the adsorbed layer of nitrogen gas is categorized into the following stages (1) to (3).

Specifically, it is possible to observe:

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

The gradient of the t-plot changes in accordance with processes (1) to (3).

Figure 3:
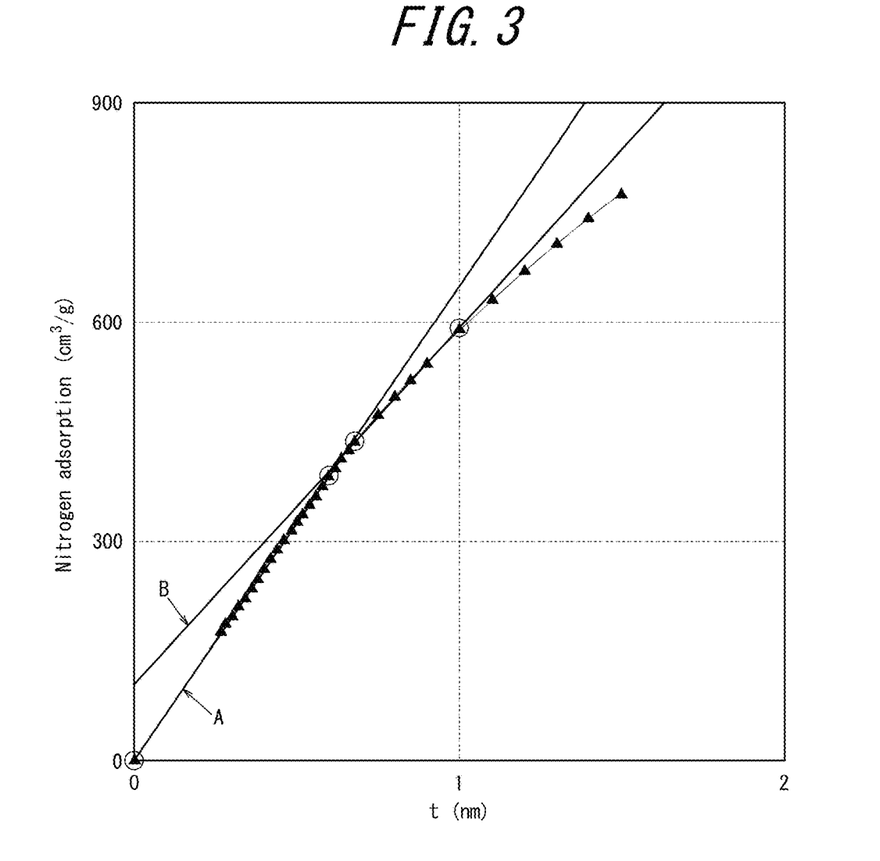
FIG. 3 is a graph illustrating a t-plot for Example 1.

FIG. 3 illustrates a t-plot of the presently disclosed CNTs. As illustrated therein, the plot is on a straight line passing through the origin in a region in which the average adsorbed nitrogen gas layer thickness t is small, but, as t increases, the plot deviates downward from the straight line to form a convex upward shape. The shape of the t-plot described above indicates that the CNTs have a large internal specific surface area as a proportion of total specific surface area and that there are a large number of openings in the side walls of the CNTs. CNTs exhibiting the t-plot shape described above can be conventionally obtained by carrying out opening formation treatment, such as oxidation treatment, after synthesis. However, a feature of the presently disclosed CNTs is that the CNTs exhibit the t-plot shape described above in a state in which the CNTs have not undergone opening formation treatment. Note that the presently disclosed CNTs may include some CNTs that have been opened at the ends thereof during production.

The t-plot for the presently disclosed CNTs normally has a bending point in a range of $0.2 \leq t \text{ (nm)} \leq 1.5$. The bending point is preferably in a range of $0.45 \leq t \text{ (nm)} \leq 1.5$ and more preferably in a range of $0.55 \leq t \text{ (nm)} \leq 1.0$. As a result of the position of the bending point of the t-plot being in the above-described range, the openings in the side walls of the CNTs have appropriate diameters, accessibility to the insides of the CNTs for substances and so forth is increased, and retention of substances and energy is improved, which makes the above-described range highly suitable. Referring to FIG. 1, the "position of the bending point" in the t-plot is defined as an intersection point of an approximated straight line A for stage (1) and an approximated straight line B for stage (3).

As described above, the presently disclosed CNTs have a large internal specific surface area as a proportion of total specific surface area. Specifically, a ratio of total specific surface area S1 and internal specific surface area S2 (S2/S1) preferably satisfies $0.05 \leq S2/S1 \leq 0.30$. S2/S1 for conventional CNTs that have not undergone opening formation treatment is roughly 0.04 at the most. However, S2/S1 for the presently disclosed CNTs can be 0.05 or greater in a state in which the CNTs have not undergone opening formation treatment. Although it is preferable for S2/S1 to be as large as possible, an upper limit of 0.30 is appropriate when production efficiency is taken into account.

Although no specific limitations are placed on the total specific surface area S1 and the internal specific surface area S2 of the presently disclosed CNTs other than satisfying the relationship described above, when considered individually, S1 is preferably from 600 $m^2/g$ to 1,800 $m^2/g$ and more preferably from 800 $m^2/g$ to 1,500 $m^2/g$. S1 of at least 600 $m^2/g$ is highly suitable for achieving superior substance and energy retention. Moreover, 1,800 $m^2/g$ is an appropriate upper limit for S1 when production efficiency is taken into account. On the other hand, S2 is preferably from 30 $m^2/g$ to 540 $m^2/g$. S2 of at least 30 $m^2/g$ is highly suitable for achieving superior substance and energy retention. Moreover, 540 $m^2/g$ is an appropriate upper limit for S2 when production efficiency is taken into account.

The total specific surface area S1 and the internal specific surface area S2 of the presently disclosed CNTs can be obtained from the t-plot for the CNTs. Referring to the t-plot illustrated in FIG. 1 for the purposes of explanation, it can be seen that the t-plot is a roughly straight line for processes (1) and (3). First, the total specific surface area S1 can be obtained from the gradient of a straight line corresponding to process (1) and an external specific surface area S3 can be obtained from the gradient of a straight line corresponding to process (3). Thereafter, the internal specific surface area S2 can be calculated by subtracting the external specific surface area S3 from the total specific surface area S1.

Measurement of an adsorption isotherm, preparation of a t-plot, and calculation of total specific surface area S1 and internal specific surface area S2 based on t-plot analysis described above can for example be performed for the presently disclosed CNTs using a BELSORP®-mini (BELSORP is a registered trademark in Japan, other countries, or both), which is commercially available measurement apparatus produced by Bel Japan Inc.

The average outer diameter of the presently disclosed CNTs is preferably from 2 nm to 5 nm. An average outer diameter of from 2 nm to 5 nm is highly suitable for increasing the total specific surface area S1. In the present description, the "average CNT outer diameter" is defined as the arithmetic average of the diameters of 50 random CNTs measured using a transmission electron microscope. The outer diameters of the CNTs are preferably distributed in a range from 1 nm to 10 nm.

In a Raman spectrum of the presently disclosed CNTs, a ratio of G band peak intensity relative to D band peak intensity (G/D ratio) is preferably at least 1 and no greater than 50, and more preferably no greater than 10. A G/D ratio of no greater than 10 indicates the presence of a large number of amorphous locations due to openings formed in the side walls. The G/D ratio is an index that is generally used to evaluate the quality of CNTs. In a Raman spectrum of CNTs measured by a Raman spectrometer, vibration modes referred to as a G band (near 1600 $cm^{-1}$) and a D band (near 1350 $cm^{-1}$) are observed. The G band is a vibration mode based on the hexagonal lattice structure of graphite forming cylindrical surfaces of the CNTs and the D band is a vibration mode based on amorphous locations. CNTs having a high peak intensity ratio of the G band and the D band (G/D ratio) are evaluated as being highly crystalline.

The presently disclosed CNTs are normally obtained as an aligned CNT aggregate in production and the height (length) in production is preferably from 100 μm to 5,000 μm.

The carbon purity of the presently disclosed CNTs without performing purification treatment is preferably at least 98 mass %, more preferably at least 99 mass %, and particularly preferably at least 99.9 mass %. In a situation in which purification treatment is not performed, the purity of the final product is the same as the carbon purity straight after growth. Purification treatment may be performed if desired. Note that the carbon purity can be obtained through elemental analysis by X-ray fluorescence.

The following explains a method for producing the presently disclosed CNTs. The presently disclosed CNTs can be obtained through appropriate setting of various conditions in a CVD method. In particular, at least the following three important conditions are required: (1) CNTs are grown on a substrate having an area of at least 400 $cm^2$; (2) a catalyst is formed on the substrate by a wet process; and (3) a continuous CNT production apparatus is used in which units respectively performing a formation step, a growth step, and a cooling step are connected. More detailed description is provided below.

(Substrate) A substrate used for a catalyst substrate is for example preferably a flat plate-shaped member that maintains its shape at a high temperature of 500° C. or higher. Specific examples include metals such as iron, nickel, chromium, molybdenum, tungsten, titanium, aluminum, manganese, cobalt, copper, silver, gold, platinum, niobium, tantalum, lead, zinc, gallium, indium, germanium, and antimony, alloys of these metals, oxides of these metals, non-metals such as silicon, quartz, glass, mica, graphite, and diamond, and ceramics. Metal materials are preferable because they are inexpensive and easy to process compared to silicon and ceramics. Particularly suitable examples include Fe—Cr (iron-chromium) alloy. Fe—Ni (iron-nickel) alloy, and Fe—Cr—Ni (iron-chromium-nickel) alloy.

Although no specific limitations are placed on the thickness of the substrate, the thickness can for example be anywhere from a thin film of approximately several micrometers up to plate of approximately several centimeters. The thickness is preferably at least 0.05 mm and no greater than 3 mm.

From a viewpoint of obtaining the presently disclosed CNTs, it is important that the substrate has an area of at least 400 $cm^2$ and preferably at least 2,500 $cm^2$. Although no specific limitations are placed on the shape of the substrate, the substrate can for example have a rectangular shape or a square shape. In the case of a square, the length of each side is preferably at least 20 cm and preferably at least 50 cm.

(Catalyst)

The catalyst substrate includes a catalyst layer formed on the substrate (in a situation in which a carburizing prevention layer is provided on the substrate, the catalyst layer is formed on the carburizing prevention layer). The catalyst enables production of CNTs and may for example be iron, nickel, cobalt, molybdenum, or a chloride or alloy of any of the preceding examples. Moreover, any of the above examples may form a composite or layered structure with aluminum, alumina, titania, titanium nitride, or silicon oxide. For example, an iron-molybdenum thin-film, an alumina-iron thin-film, an alumina-cobalt thin-film, an alumina-iron-molybdenum thin-film, an aluminum-iron thin-film, or an aluminum-iron-molybdenum thin-film may be used. The catalyst is present in an amount that enables production of CNTs. For example, in the case of iron, an iron film is preferably produced with a thickness of at least 0.1 nm and no greater than 100 nm, more preferably at least 0.5 nm and no greater than 5 nm, and particularly preferably at least 0.8 nm and no greater than 2 nm.

From a viewpoint of obtaining the presently disclosed CNTs, it is important that the catalyst layer is formed on the surface of the substrate by a wet process. The wet process includes an application step and a subsequent heating step. In the application step, a coating agent formed by dissolving an organometallic compound and/or metal salt containing an element serving as the catalyst in an organic solvent is applied onto the substrate. A stabilizer may be added to the coating agent in order to inhibit a condensation polymerization reaction of the organometallic compound and the metal salt.

The application step can for example be performed by any method among spin coating, dip coating, and application by spraying or brushing, although dip coating is preferable from a viewpoint of productivity and film thickness control.

The heating step is preferably performed after the application step. Heating initiates hydrolysis and condensation polymerization of the organometallic compound and the metal salt and causes a cured film including a metal hydroxide and/or a metal oxide to be formed on the surface of the substrate. The heating temperature is preferably roughly at least 50° C. and no greater than 400° C., and more preferably no greater than 350° C. The heating time is preferably at least 5 minutes and no greater than 20 minutes, and more preferably no greater than 15 minutes. A heating temperature and a heating time in the ranges described above can inhibit reduction in film thickness of the catalyst layer.

During a CNT growth step described further below, reduction in film thickness of the catalyst layer is thought to occur due to firing of the catalyst layer proceeding. As a result, fine catalyst particles in the catalyst layer become more mobile, the variation in CNT diameter, the frequency of CNT bending, and the number of defects (pores) increase, and thus CNTs having a large internal specific surface area are obtained. Therefore, reduction in film thickness of the catalyst layer at a stage prior to the growth step is preferably restricted as much as possible.

In a situation in which, for example, an alumina-iron thin-film is formed as the catalyst, an alumina film is formed and then an iron thin-film is formed thereafter.

Examples of organometallic compounds that can be used to form the alumina thin-film include aluminum alkoxides such as aluminum trimethoxide, aluminum triethoxide, aluminum tri-n-propoxide, aluminum tri-i-propoxide, aluminum tri-n-butoxide, aluminum tri-sec-butoxide, and aluminum tri-tert-butoxide. Other examples of organometallic compounds containing aluminum include complexes such as aluminum(III) tris(acetylacetonato). Examples of metal salts that can be used to form the alumina thin-film include aluminum sulfate, aluminum chloride, aluminum nitrate, aluminum bromide, aluminum iodide, aluminum lactate, basic aluminum chloride, and basic aluminum nitrate. Among these examples, use of an aluminum alkoxide is preferable. Any of the above examples may be used alone or as a mixture.

Examples of organometallic compounds that can be used to form the iron thin-film include iron pentacarbonyl, ferrocene, iron(II) acetylacetonate, iron(III) acetylacetonate, iron(II) trifluoroacetylacetonate, and iron(III) trifluoroacetylacetonate. Examples of metal salts that can be used to form the iron thin-film include inorganic acid iron salts such as iron sulfate, iron nitrate, iron phosphate, iron chloride, and iron bromide, and organic acid iron salts such as iron acetate, iron oxalate, iron citrate, and iron lactate. Among the above examples, use of an organic acid iron salt is preferable. Any of these examples may be used alone or as a mixture.

The stabilizer is preferably one or more selected from the group consisting of β-diketones and alkanolamines. Examples of β-diketones that can be used include acetylacetone, methyl acetoacetate, ethyl acetoacetate, benzoylacetone, dibenzoylmethane, benzoyltrifluoroacetone, furoylacetone, and trifluoroacetylacetone, with acetylacetone and ethyl acetoacetate being particularly preferable. Examples of alkanolamines that can be used include monoethanol amine, diethanolamine, triethanolamine, N-methyldiethanolamine, N-ethyldiethanolamine, N,N-dimethylaminoethanol, diisopropanolamine, and triisopropanolamine, with a secondary or tertiary alkanolamine being preferable.

Although various organic solvents such as alcohols, glycols, ketones, ethers, esters, and hydrocarbons can be used, the organic solvent is preferably an alcohol or a glycol in order to enable favorable organometallic compound and metal salt solubility. Any one of the organic solvents listed above or a mixture of any two or more of the organic solvents listed above may be used. Alcohols that are preferable in terms of handling and preservation stability include methanol, ethanol, and isopropyl alcohol.

(Formation Step)

A formation step is preferably performed before the growth step. The formation step involves providing a reducing gas environment as a surrounding environment of the catalyst and heating either or both of the catalyst and the reducing gas. The formation step leads to one or more effects among catalyst reduction, promotion of micronization of the catalyst to a state suitable for CNT growth, and improvement of catalyst activity. For example, in a situation in which the catalyst is an alumina-iron thin-film, the iron catalyst is reduced and micronized such that a large number of nanometer-size fine iron particles are formed on the alumina layer. As a result, the catalyst is placed in a highly suitable state for aligned CNT aggregate production. Although CNTs can still be produced even if the formation step is omitted, the formation step enables a dramatic improvement in production yield and quality of the aligned CNT aggregate.

The reductive gas (reducing gas) is a gas that can be used in CNT production and examples thereof include hydrogen gas, ammonia, water vapor, and mixed gases of any of the preceding gases. A mixed gas in which hydrogen gas is mixed with an inert gas such as helium gas, argon gas, or nitrogen gas may be used as the reducing gas. Besides use in the formation step, the reducing gas may also be used in the growth step as appropriate.

The temperature of the catalyst and/or the reducing gas in the formation step is preferably at least 400° C. and no greater than 1,100° C. The length of the formation step is preferably at least 3 minutes and no greater than 20 minutes, and more preferably at least 3 minutes and no greater than 10 minutes. As a result, it is possible to inhibit reduction in film thickness of the catalyst layer due to firing of the catalyst layer progressing during the formation step.

(Growth Step)

The growth step involves growing an aligned CNT aggregate on the catalyst by providing a feedstock gas environment as a surrounding environment of the catalyst and heating either or both of the catalyst and the feedstock gas. It is preferable that at least the feedstock gas is heated from a viewpoint of growing CNTs with uniform density. The heating temperature is preferably from 400° C. to 1,100° C. The growth step is carried out by introducing the feedstock gas, an inert gas, and optionally either or both of a reducing gas and a catalyst activating material into a CNT growth furnace that houses the catalyst substrate.

From a viewpoint of raising CNT production efficiency, it is preferable for the reducing gas and the feedstock gas to be supplied to the catalyst on the catalyst substrate by a gas shower.

<Feedstock Gas>

The feedstock gas is a carbon source-containing substance that is a gas at the growth temperature. Hydrocarbons such as methane, ethane, ethylene, propane, butane, pentane, hexane, heptane, propylene, and acetylene are particularly suitable as the feedstock gas. Other examples of the feedstock gas include lower alcohols such as methanol and ethanol, acetone, and oxygen-containing compounds having a low carbon number such as carbon monoxide. Moreover, a mixture of any of the above examples may be used.

<Inert Gas>

The feedstock gas may be diluted with an inert gas. The inert gas is a gas that is inactive at the temperature of CNT growth and does not react with grown CNTs. Moreover, the inert gas preferably does not reduce the activity of the catalyst. Examples of inert gases that can be used include noble gases such as helium, argon, neon, and krypton, nitrogen, hydrogen, and mixed gases of any of the preceding gases.

<Catalyst Activating Material>

A catalyst activating material may be added in the CNT growth step. Addition of the catalyst activating material enables further improvement of production efficiency and purity of the CNTs. The catalyst activating material used herein is typically an oxygen-containing material and is preferably a material that does not cause substantial damage to the CNTs at the growth temperature. Effective examples include water, oxygen, ozone, acidic gases, nitrogen oxide, oxygen-containing compounds with a low carbon number such as carbon monoxide and carbon dioxide, alcohols such as ethanol and methanol, ethers such as tetrahydrofuran, ketones such as acetone, aldehydes, esters, and mixtures of any of the preceding examples. Among the above examples, water, oxygen, carbon dioxide, carbon monoxide, and ethers are preferable, with water being particularly suitable.

Although no specific limitations are placed on the volume concentration of the catalyst activating material, a trace amount of the catalyst activating material is preferable. For example, in the case of water, the water content of a gas introduced into the furnace is from 10 ppm to 10,000 ppm and preferably from 50 ppm to 1,000 ppm.

<Other Conditions>

Reaction furnace pressure and processing time for the growth step are set as appropriate in consideration of other conditions. For example, the pressure can be approximately $10^2$ Pa to $10^7$ Pa and the processing time can be approximately 1 minute to 60 minutes.

(Cooling Step)

The cooling step involves cooling the aligned CNT aggregate, the catalyst, and the substrate in the presence of a cooling gas after the growth step. The aligned CNT aggregate, the catalyst, and the substrate are at a high temperature after the growth step, and therefore may be oxidized upon being placed in the presence of oxygen. In order to prevent oxidation, the aligned CNT aggregate, the catalyst, and the substrate are cooled to, for example, 400° C. or lower, and preferably 200° C. or lower, in the presence of the cooling gas. The cooling gas is preferably an inert gas, with nitrogen being particularly preferable in terms of safety, cost, and so forth.

(Peeling Step)

Single-walled CNTs can be peeled from the substrate physically, chemically, or mechanically. Examples of methods that can be used include peeling by an electric field, a magnetic field, centrifugal force, or surface tension, direct mechanical peeling from the substrate, and peeling from the substrate by pressure or heating. One example of a simple peeling method involves direct peeling from the substrate by pinching using tweezers. In a more preferable example, the CNTs can be cut away from the substrate using a thin blade such as a cutter blade. In another example, the CNTs can be sucked and peeled from the substrate using a vacuum pump or cleaner. The substrate still has the catalyst thereon once peeling has been performed and can be reused to grow perpendicularly oriented single-walled CNTs.

(Production Apparatus)

Figure 2:
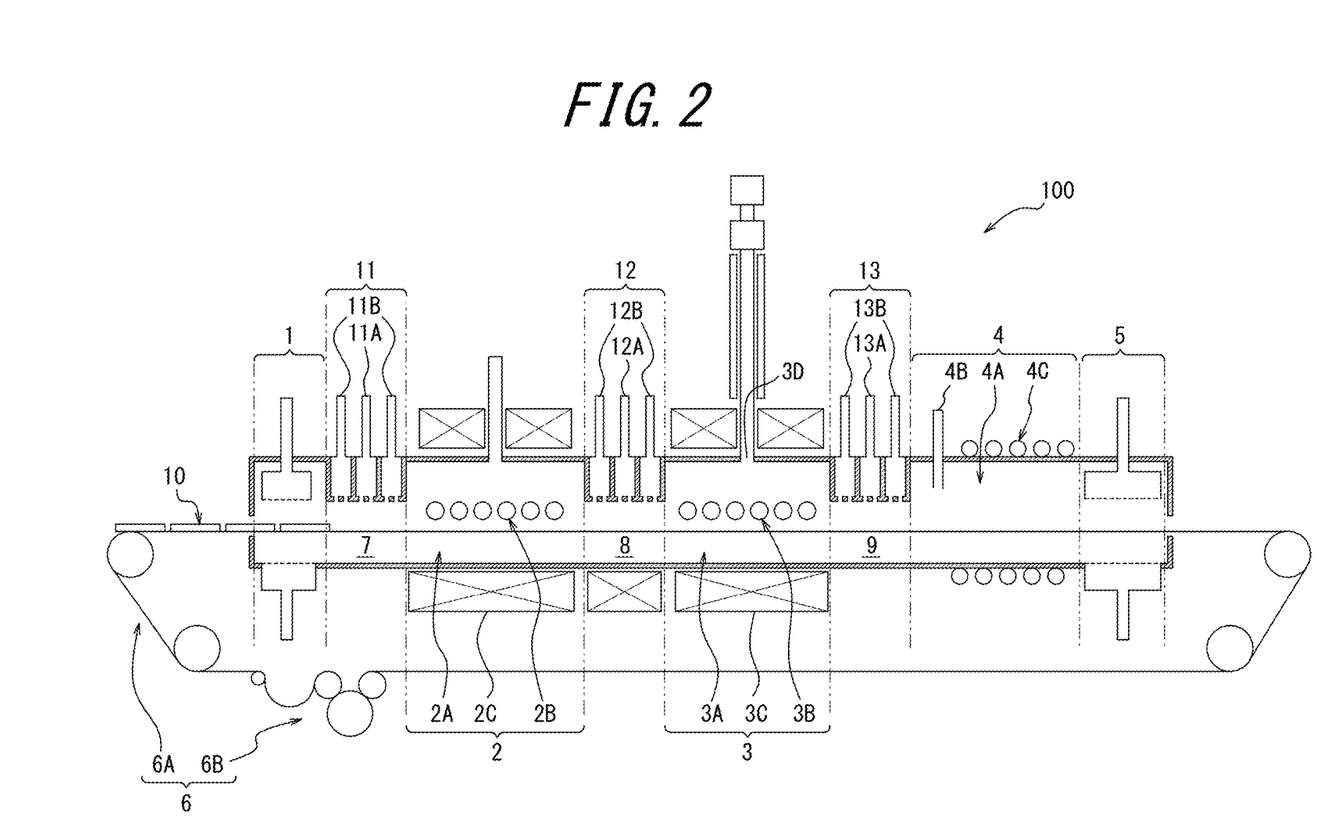
FIG. 2 is a schematic view illustrating an example of configuration of a CNT production apparatus that is applicable to the present disclosure.

FIG. 2 schematically illustrates a CNT production for producing the presently disclosed CNTs. As illustrated in FIG. 2, the production apparatus 100 includes an inlet purge section 1, a formation unit 2, a growth unit 3, a cooling unit 4, an outlet purge section 5, a conveyance unit 6, connecting sections 7, 8, and 9, and gas mixing prevention means 11, 12, and 13.

(Inlet Purge Section 1)

The inlet purge section 1 is a set of equipment for preventing external air from entering a furnace through an inlet for a catalyst substrate 10. The inlet purge section 1 has a function of purging an environment around the catalyst substrate 10 conveyed into the production apparatus 100 using an inert purge gas such as nitrogen. Specifically, the inlet purge section 1 for example includes a chamber for holding the purge gas and a spraying section for spraying the purge gas.

(Formation Unit 2)

The formation unit 2 is a set of equipment for implementing the formation step. Specifically, the formation unit 2 for example includes a formation furnace 2A for holding the reducing gas, a reducing gas spraying section 2B for spraying the reducing gas, and a heater 2C for heating either or both of the catalyst and the reducing gas.

(Growth Unit 3)

The growth unit 3 is a set of equipment for implementing the growth step. Specifically, the growth unit 3 includes a growth furnace 3A, a feedstock gas spraying section 3B for spraying the feedstock gas onto the catalyst substrate 10, and a heater 3C for heating either or both of the catalyst and the feedstock gas. An exhaust vent 3D is provided in an upper part of the growth unit 3.

(Cooling Unit 4)

The cooling unit 4 is a set of equipment for implementing the cooling step of cooling the catalyst substrate 10 after an aligned CNT aggregate is grown thereon. Specifically, the cooling unit 4 includes a cooling furnace 4A for holding a cooling gas, a water-cooling pipe 4C around an internal space of the cooling furnace in the case of water-cooling, and a cooling gas spraying section 4B that sprays the cooling gas within the cooling furnace in the case of air-cooling.

(Outlet Purge Section 5)

The outlet purge section 5 is a set of equipment for preventing external air from entering a furnace through an outlet for the catalyst substrate 10. The outlet purge section 5 has a function of purging an environment around the catalyst substrate 10 using an inert purge gas such as nitrogen. Specifically, the outlet purge section 5 for example includes a chamber for holding the purge gas and a spraying section for spraying the purge gas.

(Conveyance Unit 6)

The conveyance unit 6 is a set of equipment for conveying the catalyst substrate 10 in the furnaces of the production apparatus. Specifically, the conveyance unit 6 for example includes a conveyor belt mechanism of a mesh belt 6A and a belt driving section 6B that uses an electric motor equipped with a decelerator. The conveyance speed of the substrate by the mesh belt 6A is preferably at least 300 mm/min. A conveyance speed of at least 300 mm/min enables quick heating of the substrate in the formation step and inhibits reduction in film thickness of the catalyst layer due to firing of the catalyst layer progressing during the formation step.

(Connecting Sections 7, 8, and 9)

The connecting sections 7, 8, and 9 are sets of equipment that spatially connect internal furnace spaces of the units. Specifically, the connecting sections 7, 8, and 9 are for example furnaces or chambers that can block off external air and an environment around the catalyst substrate 10 and that can allow the catalyst substrate 10 to pass between the units.

(Gas Mixing Prevention Means 11, 12, and 13)

The gas mixing prevention means 11, 12, and 13 are sets of equipment provided in the connecting sections 7, 8, and 9 for preventing mixing of gases between adjacent furnaces in the production apparatus 100 (i.e., formation furnace 2A, growth furnace 3A, and cooling furnace 4A). The gas mixing prevention means 11, 12, and 13 respectively include seal gas spraying sections 11B, 12B, and 13B that spray a seal gas such as nitrogen along open planes of inlets and outlets in the furnaces for the catalyst substrate 10 and exhaust sections 11A, 12A, and 13A that mainly vent the sprayed seal gas externally.

The catalyst substrate 10 is loaded on the mesh belt 6A, is conveyed into the furnace of the inlet purge section 1 through an apparatus inlet, and, after being processed in each of the furnaces, is conveyed outside of the apparatus from the outlet purge section 5 through an apparatus outlet.

(Effect in Present Disclosure)

Figure 5:
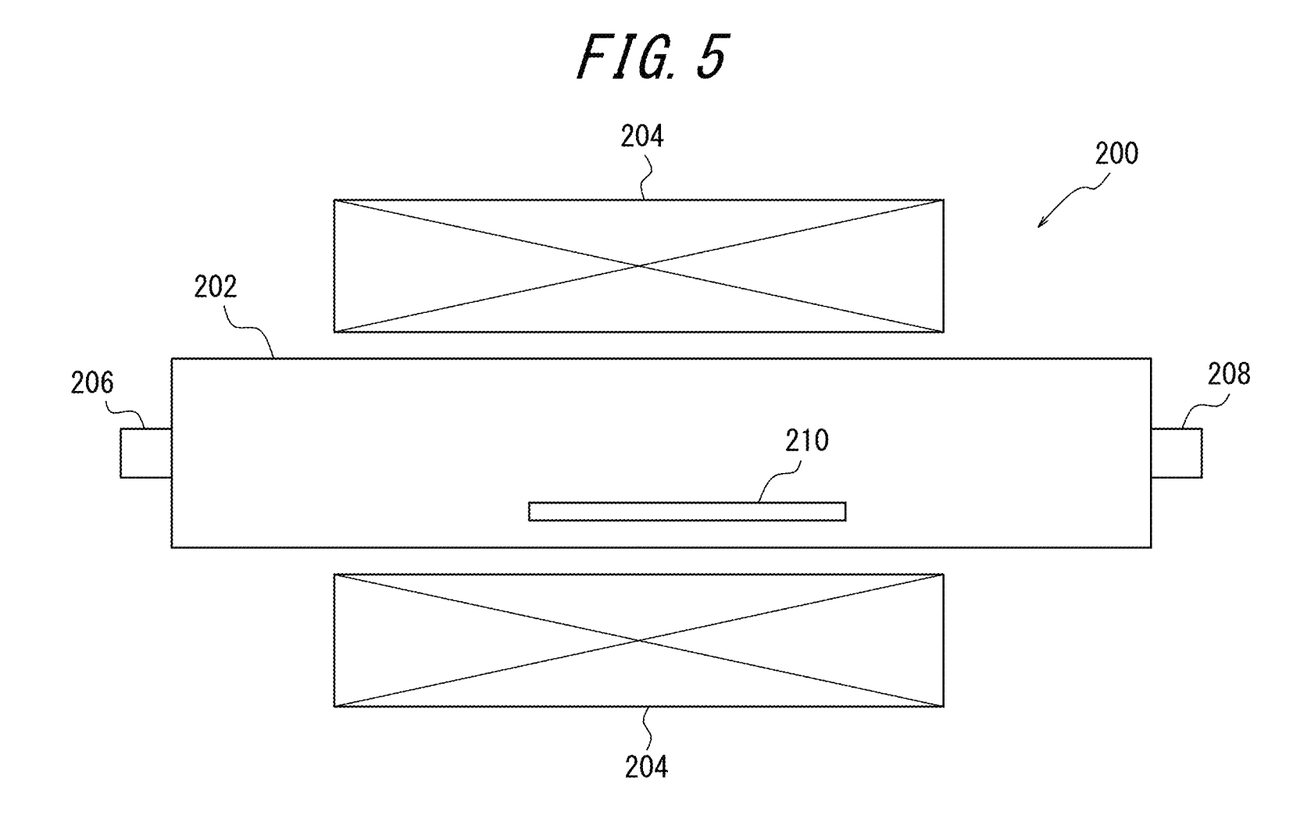
FIG. 5 is a schematic view illustrating configuration of a CNT production apparatus used in a comparative example.

The inventors consider the reason that the presently disclosed CNTs can be obtained by the production method described above to be as follows. Specifically, the inventors consider the effect of the present disclosure to be related to the relative amount of gas Vs supplied in the formation step with respect to the amount of the substrate present in the formation unit. In a small batch production apparatus such as illustrated in FIG. 5, a substrate of 1 cm² is for example loaded and gas is for example supplied at 1 sLm, giving Vs=1 sLm/cm². On the other hand, in a large continuous production apparatus such as illustrated in FIG. 2, a substrate of 15,000 cm² is for example loaded and gas is for example supplied at 150 sLm, giving Vs=0.01 sLm/cm², which is approximately $\frac{1}{100}^{th}$ of the value for the small batch production apparatus. The inventors assume that CNTs of different quality are synthesized as a result of fine catalyst particles being produced in different gas environments and thus being produced in different states.

Furthermore, the inventors believe that forming the catalyst through a wet process enables production of CNTs with a large number of defects (pores) because the fine catalyst particles are in a more mobile state. Moreover, the CNTs have a large average external diameter of from 2 nm to 5 nm and a wide diameter distribution, which is presumed to result in CNTs that are not closely packed and that include a large number of bends.

EXAMPLES

The following provides more specific description of the present disclosure through examples. However, the present disclosure is not limited to these examples. First, evaluation methods used in the present examples are explained.

<Total Specific Surface Area S1 and Internal Specific Surface Area S2>

A nitrogen gas adsorption isotherm was measured and a t-plot was obtained by the method described further above for CNTs that did not undergo opening formation treatment after synthesis. A total specific surface area S1 and an internal specific surface area S2 were calculated based on the t-plot by the method described further above.

<G/D Ratio>

An aligned CNT aggregate was used as a sample to measure the G/D ratio of CNTs near a central section of the substrate using a microscopic laser Raman system (Nicolet Almega XR produced by Thermo Fisher Scientific Inc.).

<Average External Diameter and Carbon Purity>

The average external diameter and carbon purity were measured and calculated by the methods described further above.

<Arithmetic Average Roughness>

The arithmetic average roughness Ra was measured using a laser microscope (VK-9700 produced by Keyence Corporation) with an objective magnification of ×50.

Example 1

Substrate

A flat plate of Fe—Cr alloy SUS430 (produced by JFE Steel Corporation, 18 mass % Cr) was prepared with a height of 500 mm, a width of 500 mm, and a thickness of 0.6 mm. The flat plate had an arithmetic average roughness Ra of approximately 0.063 μm for surface roughness measured at a plurality of locations using a laser microscope.

(Catalyst Formation)

A catalyst was formed on the above-described substrate by the following method. First, a coating agent for alumina film formation was prepared by dissolving 1.9 g of aluminum tri-sec-butoxide in 100 mL (78 g) of 2-propanol and by adding and dissolving 0.9 g of triisopropanolamine as a stabilizer. The above-described coating agent for alumina film formation was applied onto the substrate by dip coating under ambient conditions of a room temperature of 25° C. and a relative humidity of 50%. A holding time after substrate immersion of 20 seconds, a pulling up speed of 10 mm/s, and an air drying time after substrate pulling up of 5 minutes were adopted as application conditions. Next, heating was performed for 15 minutes in an air environment at 300° C. and subsequently cooling was performed to room temperature. As a result, an alumina film having a film-thickness of 40 nm was formed on the substrate.

Next, an iron film coating agent was prepared by dissolving 174 mg of iron acetate in 100 mL of 2-propanol and by adding and dissolving 190 mg of triisopropanolamine as a stabilizer. The iron film coating agent was applied onto the substrate with the alumina film formed thereon by dip coating at ambient conditions of a room temperature of 25° C. and a relative humidity of 50%. A holding time after substrate immersion of 20 seconds, a pulling up speed of 3 mm/s, and an air drying time after substrate pulling up of 5 minutes were adopted as application conditions. Next, heating was performed for 15 minutes in an air environment at 100° C. and subsequently cooling was performed to room temperature. As a result, a catalyst production film having a film-thickness of 3 nm was formed.

(CNT Synthesis)

A continuous production apparatus such as illustrated in FIG. 2 was used to produce an aligned CNT aggregate by continuously carrying out steps including a formation step and a growth step. The catalyst substrate described above was loaded onto the mesh belt of the production apparatus and was conveyed on the mesh belt at a constant conveyance speed (360 mm/min) while the aligned CNT aggregate was produced on the substrate. Conditions in each of the parts of the production apparatus were set as shown below.

TABLE 1

|  | Gas flow [sLm] Composition [vol %] | Internal furnace temperature [° C.] | Processing time [min] | Exhaust amount [sLm] |
| --- | --- | --- | --- | --- |
| Inlet purge section 1 | 300 $N_2$: 100% | — | — | — |
| Gas mixing prevention means 11 | 100 $N_2$: 100% | — | — | 100 |
| Formation unit 2 | 140 $H_2$: 60% $N_2$: 40% | 822 | 9 | 140 |
| Gas mixing prevention means 12 | 125 $N_2$: 100% | — | — | 125 |
| Growth unit 3 | 150 $C_2H_4$: 10% $H_2O$: 55-440 ppm $N_2$: Remainder | 817 | 11 | 150 |
| Gas mixing prevention means 13 | 100 $N_2$: 100% | — | — | 100 |
| Cooling unit 4 | 50 $N_2$: 100% | — | 30 | — |
| Outlet purge section 5 | 250 $N_2$: 100% | — | — | — |

(Evaluation Results)

Figure 4:
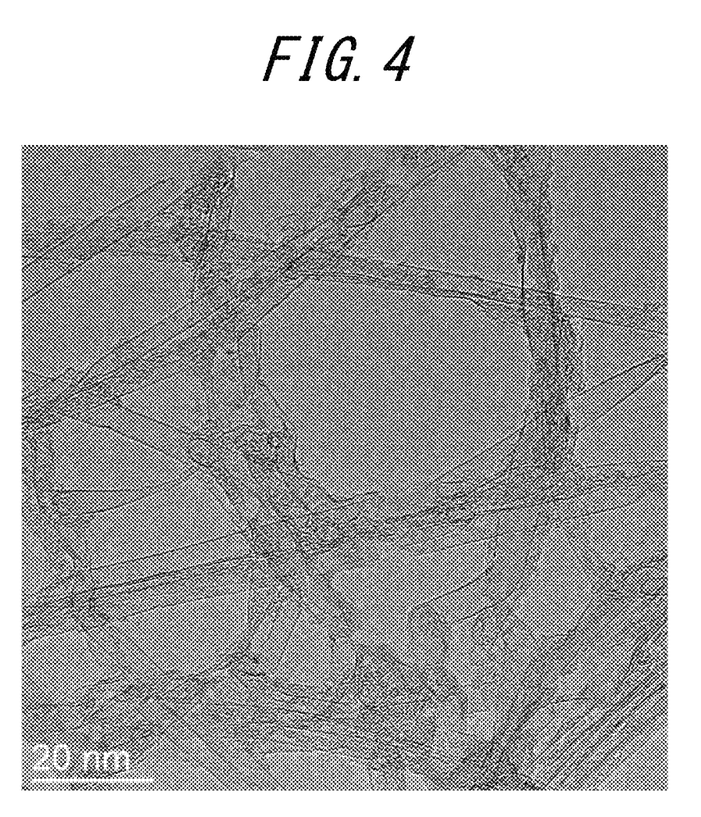
FIG. 4 is a TEM image of CNTs in Example 1.

FIG. 3 illustrates a t-plot for CNTs that were obtained by peeling the produced aligned CNT aggregate from the substrate. FIG. 3 clearly illustrates that the t-plot bends in a convex upward shape near to t=0.6 nm. The total specific surface area S1, the internal specific surface area S2, the ratio S2/S1, the value of t at the bending point, and the average external diameter of the CNTs are shown in Table 3. Furthermore, FIG. 4 is a TEM image of the CNTs that were peeled from the substrate. A large number of locations at which openings were present in the side walls of the CNTs were observed in FIG. 4. Other properties of the CNTs included a G/D ratio of 3.0, an external diameter distribution of 1 nm to 9 nm, and a carbon purity of 99.9%.

Example 2

The aligned CNT aggregate produced in Example 1 was peeled from the substrate using a blade made of resin. Next, a powder of sodium carbonate (produced by Wako Pure Chemical Industries, Ltd.) was scattered on the surface of the substrate and the surface of the substrate was washed with water by wiping the surface using non-woven fabric containing water and subsequently wiping the surface with a sponge containing water. Catalyst formation and CNT production were then carried out in the same way as in Example 1 in all aspects other than that the washed substrate obtained as described above was used.

Evaluation results for the aligned CNT aggregate that was obtained are summarized in Table 3. Other properties of the CNTs included a G/D ratio of 4.0, an external diameter distribution of 1 nm to 8 nm, and a carbon purity of 99.9%.

Comparative Example 1

A flat plate of Fe—Cr alloy SUS430 (produced by JFE Steel Corporation, 18 mass % Cr) was prepared with a height of 40 mm, a width of 40 mm, and a thickness of 0.6 mm. The flat plate had an arithmetic average roughness Ra of approximately 0.063 µm for surface roughness measured using a laser microscope.

A silicon dioxide film (carburizing prevention layer) of 100 nm in thickness was formed on both the front and rear surfaces of the substrate using a sputtering device. Next, an aluminum oxide film of 10 nm in thickness and an iron film of 1.0 nm in thickness were formed only on the front surface of the substrate using the sputtering device.

A batch production apparatus 200 such as illustrated in FIG. 5 was used to produce an aligned CNT aggregate by performing a formation step and a growth step in order. The apparatus 200 included a reaction furnace 202 made from quartz, a heater 204 formed by a resistance heating coil provided around the reaction chamber 202, a gas supply inlet 206 for supplying the reducing gas and the feedstock gas that was connected to one end of the reaction furnace 202, an exhaust vent 208 that was connected to the other end of the reaction furnace 202, and a holder 210 made from quartz to which the substrate was fixed. Although not illustrated, control devices such as a pressure control valve and a flow control valve for controlling flow of the reducing gas and the feedstock gas were provided at appropriate locations. The production conditions are shown in Table 2.

TABLE 2

| | Gas flow [sccm] Composition [vol %] | Internal furnace temperature [° C.] | Processing time [min] |
|---|---|---|---|
| Formation step | 4000 $H_2$: 90% $N_2$: 10% | 800 | 30 |
| Growth step | 1500 $C_2H_4$: 10% $H_2O$: 380 ppm $N_2$: Remainder | 800 | 10 |

Figure 6:
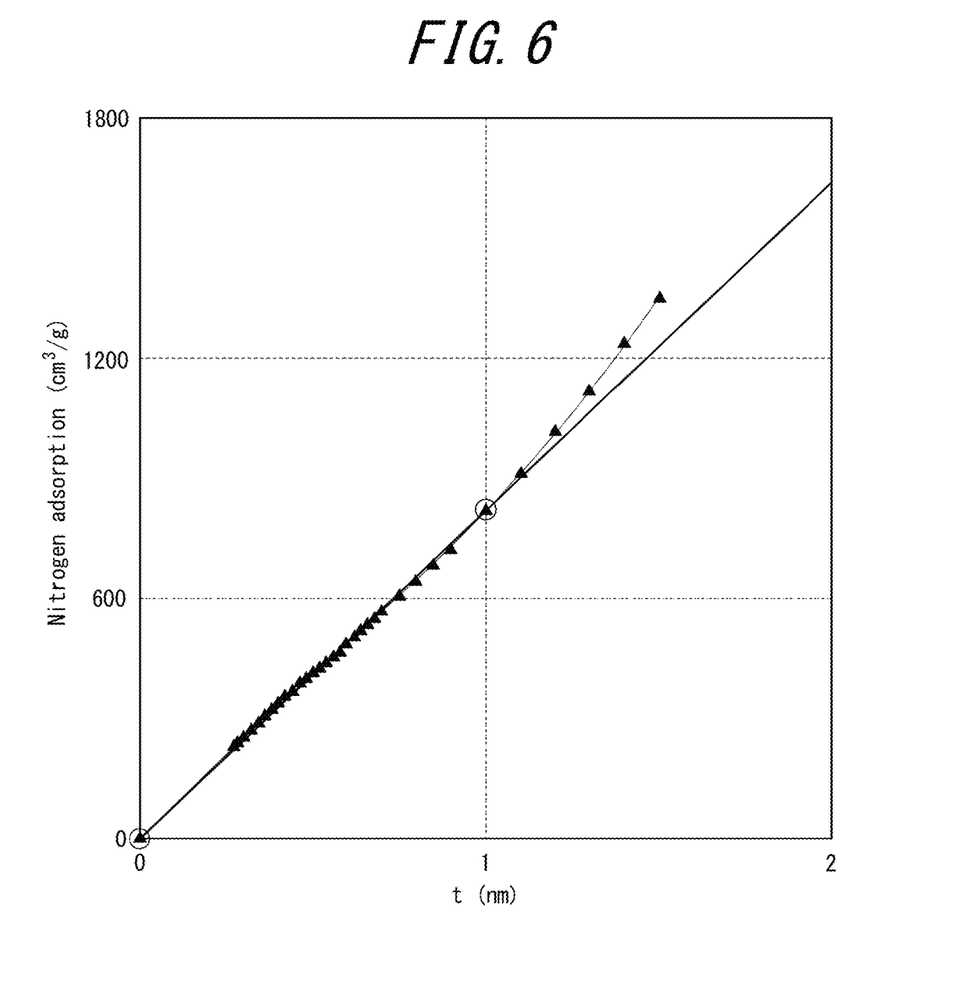
FIG. 6 is a graph illustrating a t-plot for the comparative example.
Figure 7:
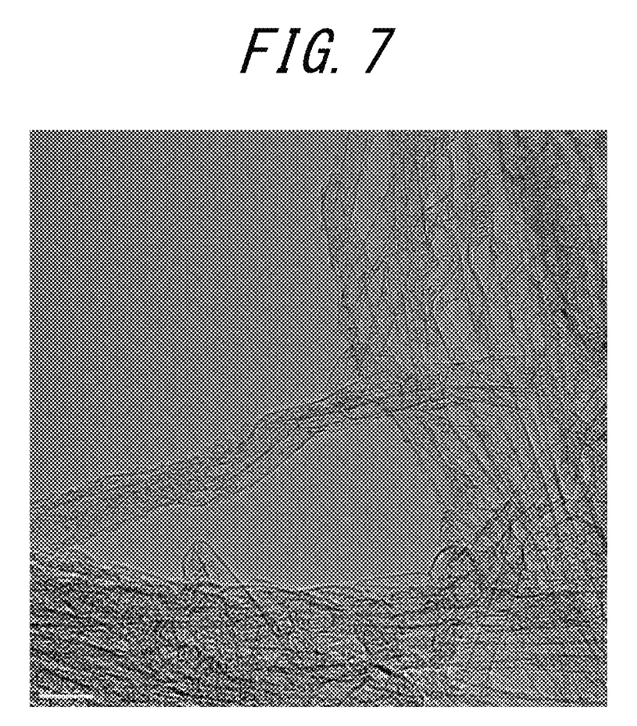
FIG. 7 is a TEM image of CNTs in the comparative example.

FIG. 6 illustrates a t-plot for CNTs that were obtained by peeling the produced aligned CNT aggregate from the substrate. FIG. 6 clearly illustrates that the t-plot had a straight line shape passing through the origin. Evaluation results for the obtained CNTs are summarized in Table 3. Furthermore, FIG. 7 is a TEM image of the CNTs that were peeled from the substrate. No indication of openings in the side walls of the CNTs was observed in FIG. 7. Other properties of the CNTs included a G/D ratio of 4.5 and a carbon purity of 99.9%.

TABLE 3

| | t plot shape | Total specific surface area S1 ($m^2/g$) | Internal specific surface area S2 ($m^2/g$) | S2/S1 | t at bending point (nm) | Average external diameter (nm) |
|---|---|---|---|---|---|---|
| Example 1 | Convex upward | 1020 | 250 | 0.25 | 0.6 | 4.4 |
| Example 2 | Convex upward | 1270 | 110 | 0.09 | 0.6 | 3.8 |
| Comparative Example 1 | Straight line | 1240 | 50 | 0.04 | — | 2.8 |

As described above, the CNTs in Examples 1 and 2 were produced using a catalyst substrate prepared by forming a catalyst through a wet process on a substrate having an area of at least 400 $cm^2$ and using a continuous CNT production apparatus in which units respectively performing a formation step, a growth step, and a cooling step were connected. In contrast, the CNTs in Comparative Example 1 were produced using a catalyst substrate prepared by forming a catalyst through a dry process on a substrate having an area of less than 400 $cm^2$ and using a batch CNT production apparatus. It can be concluded from Table 3 that compared to the CNTs in Comparative Example 1, the CNTs in Examples 1 and 2 had a large internal specific surface area S2 as a proportion of total specific surface area S1 without undergoing opening formation treatment, had ends that remained closed, and had a large number of openings in the side walls.

INDUSTRIAL APPLICABILITY

The presently disclosed carbon nanotubes allow effect utilization of the insides thereof as-synthesized, without undergoing opening formation treatment. Therefore, the presently disclosed carbon nanotubes have superior substance and energy retention, energy transmission, and energy dispersion.

REFERENCE SIGNS LIST

100 CNT production apparatus
1 inlet purge section
2 formation unit
3 growth unit
4 cooling unit
5 outlet purge section
6 conveyance unit
7, 8, 9 connecting section
10 catalyst substrate
11, 12, 13 gas mixing prevention means

The invention claimed is:

1. Carbon nanotubes that have not undergone opening formation treatment and that exhibit a convex upward shape in a t-plot obtained from an adsorption isotherm, wherein each carbon nanotube has an open end and a closed end.

2. The carbon nanotubes of claim 1, wherein
the t-plot has a bending point in a range of 0.2 nm t 1.5 nm.

3. The carbon nanotubes of claim 2, wherein
a total specific surface area S1 and an internal specific surface area S2 obtained from the t-plot satisfy $0.05 \leq S2/S1 \leq 0.30$.

4. The carbon nanotubes of claim 3, wherein
an average external diameter of the carbon nanotubes is from 2 nm to 5 nm.

5. The carbon nanotubes of claim 2, wherein
an average external diameter of the carbon nanotubes is from 2 nm to 5 nm.

6. The carbon nanotubes of claim 1, wherein
a total specific surface area S1 and an internal specific surface area S2 obtained from the t-plot satisfy $0.05 \leq S2/S1 \leq 0.30$.

7. The carbon nanotubes of claim 6, wherein
an average external diameter of the carbon nanotubes is from 2 nm to 5 nm.

8. The carbon nanotubes of claim 1, wherein
an average external diameter of the carbon nanotubes is from 2 nm to 5 nm.

* * * * *

UNITED STATES PATENT AND TRADEMARK OFFICE
CERTIFICATE OF CORRECTION

| | | |
|---|---|---|
| PATENT NO. | : 9,776,873 B2 | Page 1 of 1 |
| APPLICATION NO. | : 15/030975 | |
| DATED | : October 3, 2017 | |
| INVENTOR(S) | : Hirokazu Takai et al. | |

It is certified that error appears in the above-identified patent and that said Letters Patent is hereby corrected as shown below:

In the Specification

Column 3, Line 43, please delete "P/P" and insert --P/P0--.

Column 7, Line 42, please delete "monoethanol amine" and insert --monoethanolamine--.

Column 9, Line 47, please delete "production for" and insert --production apparatus 100 for--.

Signed and Sealed this
Fifth Day of December, 2017

Joseph Matal
*Performing the Functions and Duties of the
Under Secretary of Commerce for Intellectual Property and
Director of the United States Patent and Trademark Office*